March 17, 1964     F. D. MAYFIELD ETAL     3,125,614
DISTILLATION COLUMN
Original Filed March 5, 1959     2 Sheets-Sheet 1
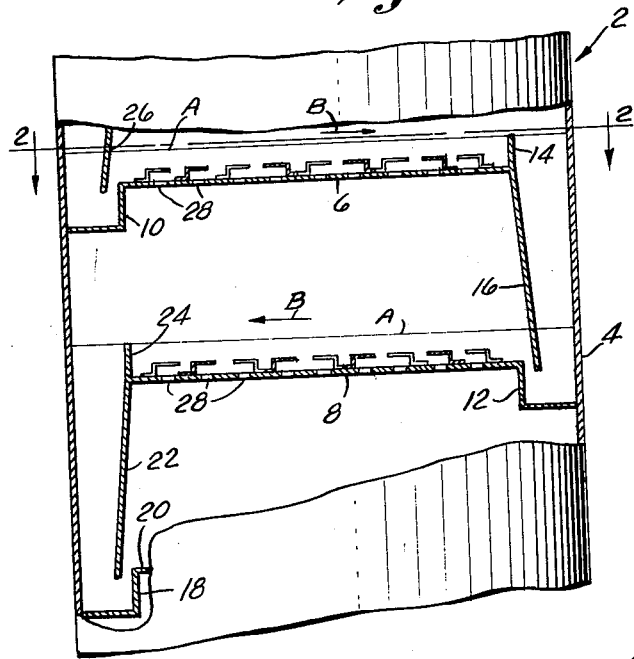
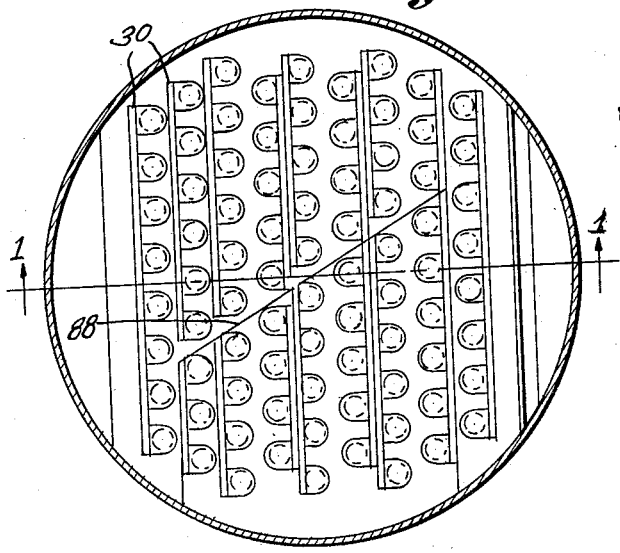
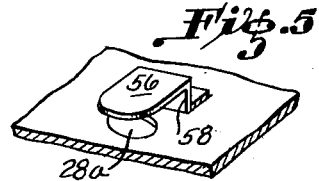
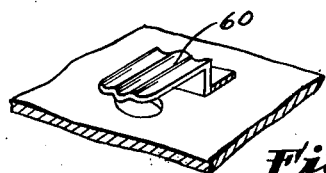
INVENTORS
FRANKLIN D. MAYFIELD
JAMES H. MAYES
BY

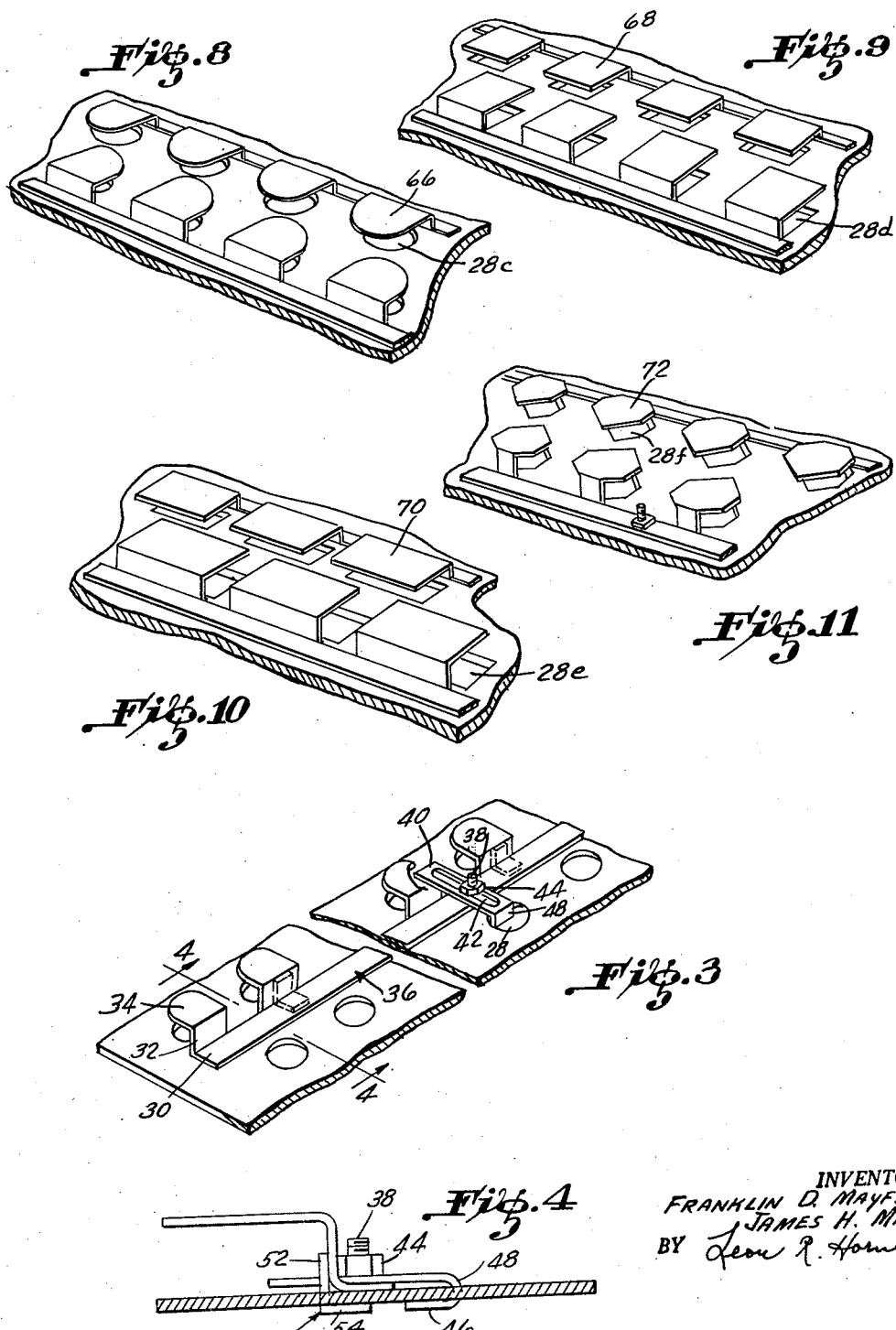

United States Patent Office 3,125,614
Patented Mar. 17, 1964

3,125,614
DISTILLATION COLUMN
Franklin D. Mayfield and James H. Mayes, Baton Rouge, La., assignors to Foster Grant Co., Inc., Leominster, Mass., a corporation of Delaware
Continuation of application Ser. No. 797,405, Mar. 5, 1959. This application Dec. 4, 1961, Ser. No. 157,613
8 Claims. (Cl. 261—114)

This invention relates to an improved fluid-fluid contacting device and more particularly to a vapor-liquid contacting apparatus, which is usually referred to as a tower or column, for causing intimate and efficient contacting of upflowing vapor and downflowing liquid. The apparatus of this invention is particularly useful in liquid-vapor contacting as usually practiced in distillation and fractionation and absorption of materials and is also useful where chemical reactions are promoted during the course of such contacting.

Contacting of liquids and vapor in towers and columns is a well-known art. In such apparatus, generally the liquid flows downwardly through the column, and the vapor rises in an upward direction through the column, countercurrently to said liquid. Throughout the tower or column, there are trays vertically arranged at regular, and sometimes, irregular intervals, and the contacting is repeatedly brought about on these trays. Generally, each tray has a downcomer leading therefrom to the tray below it, thereby allowing the liquid to flow downwardly to the next tray. In some cases, downcomers are not used, but the liquid and vapor each work their way through the same opening through the tray. Sometimes, these trays have the well known bubble cap and chimney assembly mounted thereupon, and sometimes, simple well-known sieve trays are used alone. Also utilized are trays having loose liftable covers for the holes therethrough, and these covers are of varying weights, thereby enabling differently weighted covers to be distributed on each tray in a predetermined pattern. Trays having lean-to devices positioned over the openings therethrough for directing the vapor passing therethrough through the liquid on the tray in one direction only are likewise known and utilized as are trays having lean-to devices over the openings directing the vapor through the liquid in a single direction in a geometrical pattern such as that of an ellipse. However, such prior contacting devices often malfunction particularly with high vapor rates and low liquid rates, and we have found that with very high vapor rates and low liquid rates complete atomization of the liquid occurred with disastrous results with respect to the column performance and to fractionation.

The improved apparatus of our invention is one in which there are positioned over the openings through the tray deflector members, some directioned towards the downcomer and some directioned towards the inlet weir on the tray. A predetermined number of the deflector members is so positioned in each direction in accordance with the vapor flow rate and the liquid flow rate thereby to control the patterns of the said vapor and liquid flows in accordance with the respective flow rates and to accomplish proper control of the liquid-vapor contacting. Each deflector is spaced from and positioned over at least a portion of the respective opening in combination therewith. Each tray has an outlet weir and a downcomer oppositely positioned with respect to the inlet weir on the tray, and the downcomer extends downwardly from its tray toward the inlet weir on the tray therebelow. The line of flow of the liquid on the tray is, of course, across the tray from the inlet weir to the outlet weir and down the tray. Each of the trays has a plurality of spaced-apart rows of spaced-apart openings therethrough, and each of said rows is substantially perpendicular to the line of flow across the tray, the holes in one of said rows being preferably staggered with respect to the holes in the row adjacent. The deflector members are substantially parallel, for at least a portion thereof, to the tray thereby to deflect the rising vapor substantially horizontally through the liquid on the tray. The deflector members here tend to cause the liquid to flow on the tray in the same direction as they are pointed. Thus, for high liquid loads, such as in an oil absorber, most all of the deflector members are pointed towards the outlet weir and downcomer. For lesser liquid loads, at high vapor rates, more and more of the deflector members are pointed in the opposite direction, until possibly half of the deflector members utilized are pointed in each direction. In our apparatus, the tray openings can be small, viz. less than one inch diameter, or can be large, viz. several inches in diameter, and can have the configuration of a circle, square, rectangle, hexagon, and the like. The portion of the deflector member positioned over the opening can likewise be one of the many aforementioned shapes and can be considerably smaller or larger in area than the respective opening area to accomplish the horizontal deflection of the vapor. Further, said deflector portion need not be centered directly over the respective hole, thereby simplifying construction of the apparatus. Likewise, said deflector portion can have a fluted or corrugated surface. The utilization of the various aforementioned structural embodiments is dependent upon the materials available and/or the existing equipment and upon the operating conditions in the tower.

The deflector means of our invention is such as can be used on the trays of an existing bubble-cap plate tower or column wherein the cap and chimney assemblies are of the removable type. Here, the said assemblies need only be removed and the deflector means installed over the openings where previously were the chimneys. As will be readily apparent, the tower of our invention can be operated under an extremely wide range of operating conditions, and stable and efficient tray operation can be maintained by merely varying the number of the deflectors directioned with the liquid flow as compared with the number of deflectors directioned against the liquid flow. In our apparatus, no specific zones, as such, are required to be bounded by the radii or diameters of the particular tray on which the deflectors are mounted.

An object of our invention is to provide a fluid-fluid contact device for causing intimate and efficient contacting of liquids wherein the patterns of the respective fluid flows are controlled in accordance with the respective fluid flow rates thereby to accomplish proper control of the fluid-fluid contacting therein.

Another object of our invention is to provide a vapor-liquid contact apparatus for causing intimate and efficient contacting of upflowing vapor and downflowing liquid and for controlling the pattern of liquid flow and of vapor flow corresponding to an extremely wide range of flow rates.

Another object of our invention is to provide a vapor-liquid contact apparatus for causing intimate and efficient contacting of upflowing vapor and downflowing liquid.

Other objects and features will become readily apparent from the following detailed description which is not limiting but only illustrative of the preferred embodiment of our invention.

FIGURE 1 is a vertical section through a portion of our vapor-liquid contacting apparatus showing two trays and the appertaining deflectors, weirs and downcomers, taken on line 1—1 of FIGURE 2.

FIGURE 2 is a top cross-sectional view taken on line 2—2 of FIGURE 1.

FIGURE 3 is a perspective view of a typical deflecting means installation on a tray.

FIGURE 4 is a cross-sectional view taken on line 4—4 of FIGURE 3.

FIGURE 5 is a perspective view of one type of a deflector means.

FIGURE 6 is a perspective view of another type of a deflector means.

FIGURE 7 is a perspective view of another type of a deflector means.

FIGURE 8 is a perspective view of a deflector means having a semi-circular top portion.

FIGURE 9 is a perspective view of a deflector means having a square top portion.

FIGURE 10 is a perspective view of a deflector means having a rectangular top portion.

FIGURE 11 is a perspective view of a deflector means having a hexagonal top portion.

More specifically, the contacting apparatus or tower 2 in which the vapor flows upwardly and the liquid flows downward comprises the vertical housing 4, a plurality of vertically spaced-apart superposed contacting trays or decks 6 and 8, the only two trays shown of the plurality of trays in the apparatus. Tray 6 has inlet weir 10 associated therewith, and tray 8 has inlet weir 12 associated with it, and each tray construction is typical of the tray construction throughout the tower. Also associated with tray 6 is outlet weir 14 and downcomer 16 extending downwardly towards inlet weir 12 of tray 8. Extending downwardly from tray 8 to the inlet weir 18 of the tray 20 therebelow is downcomer 22, and on tray 8 is also outlet weir 24, as clearly shown in FIGURE 1. Extending downwardly to inlet weir 10 of tray 6 is downcomer 26 from the tray (not shown) above said tray 6. As is clearly seen from the appended drawings, the outlet weir and downcomer combinations on said trays are staggered with respect to each other, and the inlet weirs in said trays are also staggered with respect to each other. The liquid level is maintained on each tray above line A by means of the outlet weir and thereby flows over the outlet weir. Also, as clearly shown in FIGURE 1, the outlet weir and downcomer combination is positioned opposite to the inlet weir on each tray, and the line of flow of the liquid on each tray is across the tray from the inlet weir towards the outlet weir and downcomer combination, as indicated by arrow B.

Each of said trays has a plurality of spaced-apart rows of spaced-apart openings 28 therethrough, and each of said rows, as clearly shown on FIGURE 2, is perpendicular to the line of liquid flow shown to be in the direction of the arrow B. Also, as clearly shown in FIGURE 2, each of the openings 28 in each row is staggered with respect to the openings in the adjacent row.

The means for deflecting vapor, said means designated by 36, rising through openings 28 horizontally through the liquid on the respective tray towards the respective outlet weir and downcomer combination in directions parallel to the line of flow of the liquid on the tray in accordance with the respective vapor flow rate and liquid flow rate includes a strip member 30. Attached to said strip member 30 at spaced intervals are the transverse leg members 32, and attached to each of said leg members 32 is the deflector member 34 which extends, for at least a portion thereof, over the opening 28 and is parallel to the tray, as is clearly shown in the appended drawings. Each strip member 30 of the deflecting means 36 has attached thereto at spaced apart intervals, as by welding, the threaded stud 38 to receive the bent-end clamping member 40 having the elongated opening 42 therethrough which receives the stud 38, which is held against member 40 by the nut 44. The clamping member 40 has as an integral part thereof the portion 46 and the portion 48 for positioning through an opening 28 in the row of openings adjacent to the row of openings over which the deflector members 34 are positioned. Also, attached to spaced-apart leg portions 32 are bracing and grabbing members 50 having a vertical leg 52 attached to leg portion 32 and a horizontal leg 54 spaced from the bottom portion of the tray, thereby permitting easy attachment of the vapor deflecting means 36 to the tray. The elevation of the leg portion 32 with respect to the respective tray of course controls the elevation of the deflector member 34 with respect to the tray opening and can be of such a dimension that the percentage of dry tray pressure drop occurring can be so controlled that a predetermined dry tray pressure drop occurs with the so-positioned deflector members as compared to the pressure drop through the openings alone. The structure here, as is clearly shown in the appended drawings, is such that a predetermined number of deflector members are positioned to point towards the outlet weir and downcomer combination and a predetermined number of deflector members are positioned to point towards the inlet weir, in accordance with the vapor flow rate and the liquid flow rate to control the pattern of liquid flow and vapor flow in accordance with the respective flow rates to accomplish proper control of the liquid-vapor contacting thereby to obtain intimate and efficient contacting of upflowing vapor and downflowing liquid especially at very high vapor rates and low liquid rates and at very high vapor rates and very high liquid rates without atomization of the liquid. With this novel construction, the positioning of the deflector means does not follow any specific zone arrangement. If required, some deflector members in one row of openings can be directioned towards the inlet weir and some deflector members in the same row can be directioned towards the outlet weir.

The deflector member 56 and its leg portion 58 can be of a larger cross-sectional area than its associated opening 28a, as clearly shown in FIGURE 5, or the deflector member 60 can be fluted, as clearly shown in FIGURE 6, or the deflector member 62 and its leg portion 64 can be of a smaller cross-sectional area than its associated opening 28b, as clearly shown in FIGURE 7.

Further, the openings through the tray can be circular as openings 28c and have associated therewith the semi-circular deflector members 66, as clearly shown in FIGURE 8; the openings through the tray can be square as openings 28d and have associated therewith the square deflector members 68, as clearly shown in FIGURE 9; the openings through the tray can be rectangular as openings 28e and have associated therewith the rectangular deflector members 70, as clearly shown in FIGURE 10; and the openings through the tray can be hexagonal as openings 28f and have associated therewith the hexagonal deflector members 72, as clearly shown in FIGURE 11. Also, the configuration of the opening through the tray can be different from the configuration of the deflector member; for example, the opening can be circular and the deflector member can be rectangular.

In accordance with our invention, a bubble cap tray column in which the cap and chimney assemblies are removable can be changed in structure by simply removing the said assemblies and installing the deflector means hereinbefore described over the tray openings. With the apparatus of our invention, the contacting of the vapor and liquid can be carried out at a wide range of vapor and liquid flow rates while maintaining stable and efficient tray operation by simply varying the number of deflector members directioned towards the outlet weir as compared with the deflector members directioned towards the inlet weir. For example, in a tower wherein there are very high vapor rates and low liquid rates, the number of deflector members pointed towards the outlet weir, there being utilized downcomers, range from 50 to 55% of the total number, and the number pointed towards the inlet weir range from 50–45% of the total number. In a column wherein there are low vapor velocities and very high liquid velocities, a larger number of the deflector members is directed towards the outlet weir.

For example, in a typical 9-foot diameter tower or column wherein the system is an air-water system there is obtained the data shown in Table I.

Table I

DRY TRAY PRESSURE DROP DATA FOR TEST TRAY EQUIPPED WITH DEFLECTORS AND BUBBLE CAPS

| Deflectors | | Bubble Caps | |
|---|---|---|---|
| Air Rate, ft.³/sec./ft.² Column Area | Dry Tray Pressure Drop, In. Water | Air Rate, ft.³/sec./ft.² Column Area | Dry Tray Pressure Drop, In. Water |
| 6.55 | 0.5 | 5.7 | 0.5 |
| 8.27 | 1.0 | 7.05 | 1.0 |
| 9.35 | 1.37 | 8.14 | 1.5 |
| 10.35 | 1.75 | 9.19 | 2.0 |
| 11.4 | 2.25 | 10.15 | 2.5 |

WET TRAY PRESSURE DROP DATA FOR TEST TRAY EQUIPPED WITH DEFLECTORS @ LIQUID FLOWS PER FT. OF WEIR

| Air Rate, ft.³/sec./ft.² Column Area | Pressure Drop, In. Water @ 640 g.p.h./ft. | Pressure Drop, In. Water @ 860 g.p.h./ft. |
|---|---|---|
| 5.15 | 2.12 | 2.42 |
| 8.42 | 2.38 | 2.68 |
| 10.35 | 2.63 | 2.94 |
| 11.8 | 2.88 | 3.20 |

As shown, comparative data for the same column utilizing the deflector means of our invention and caps and chimney assemblies which were removed and replaced by our deflector means was obtained.

With our apparatus, as is readily apparent from the foregoing description, the liquid hydraulic gradient which many times presents quite a problem on large diameter trays of bubble cap tray columns can be reduced to the desired value by orienting a greater number of deflector members towards the outlet weir. Also, it is within the scope of our invention to utilize our deflector means on trays which still retain the cap and chimney assembly over some of the openings in order to minimize the hydraulic gradient and thereby improve the efficiency. Also, utilizing our novel deflector means, by equipping alternate trays in a column having trays of the turbo grid type with the deflector means of our invention, the liquid and vapor can be redistributed in a proper manner periodically through the column, as required. For example, every fifth tray or every third tray or in extreme cases, every tray could be so equipped to maintain perfect control of the liquid and vapor. Thusly, our deflector means can be effectively used with trays such as the turbo grid type which do not have downcomers.

Because of the fact that our deflector means is so constructed, the deflector members are capable of easy positioning on and simple removal from the tray and, at the same time, are capable of being positioned in a predetermined direction on each tray with respect to the outlet weir and inlet weir, depending upon the liquid load and vapor load. Further, with this structure of our invention wherein some of the deflector members can be pointed in the direction of the outlet weir, and the remainder of the deflector members can be pointed in the direction of the inlet weir, by reason of the easy mobility of each strip having the deflector members attached thereto, the liquid holdup on each tray is properly controlled and the liquid level is maintained on each tray, thereby causing intimate contacting of the liquid and vapor on each tray to effect separation of the components from the mixture, since the deflector members and their associated leg portions cause flowing of the liquid on the tray in the same direction that they point. In addition, removal of the trays for cleaning and repair is simplified, for the deflector means can be easily removed without damage, as by bending. The cleaning and repair is further simplified by including in combination with some trays the intertray manway 88 which enables a portion of the tray to be removed to allow an individual to enter a large column easily.

Many alterations and changes may be made without departing from the spirit and scope of our invention which is set forth in the appended claims which are to be construed as broadly as possible in view of the prior art.

This application is a continuation of U.S. patent application S.N. 797,405, filed March 5, 1959, and now abandoned.

We claim:

1. A fluid-fluid contact device for causing intimate and efficient contacting of fluids comprising, in combination, a housing, a plurality of spaced-apart superposed contacting trays positioned in said housing, each of said trays having a plurality of spaced-apart rows of spaced-apart openings therethrough, and means for deflecting fluid rising through said openings substantially horizontally through fluid on at least one tray and for controlling the patterns of the respective fluid flows in accordance with the respective fluid flow rates, said means including a predetermined number of spaced-apart deflector members directioned in accordance with the respective fluid flow rates, at least one of said deflector members being positioned over at least a portion of an opening, and means for adjusting said deflector members in predetermined positions, said adjusting means including a strip member attached to said deflector members and clamping means removably attached to said strip member and to said tray, whereby there is accomplished the proper desired control of the fluid-fluid contacting.

2. A fluid-fluid contact device for causing intimate and efficient contacting of fluids comprising, in combination, a housing, a plurality of spaced-apart superposed contacting trays positioned in said housing, each of said trays having a plurality of spaced-apart rows of spaced-apart openings therethrough, and means for deflecting fluid rising through said openings substantially horizontally through fluid on at least one tray in a plurality of directions thereon and for controlling the patterns of the respective fluid flows in accordance with the respective fluid flow rates, said means including a predetermined number of spaced-apart deflector members positioned on at least one tray and directioned in accordance with the respective fluid flow rates, at least one of said deflector members being positioned over at least a portion of an opening, and means for adjusting said deflector members in predetermined positions, said adjusting means including a strip member attached to said deflector members and clamping means removably attached to said strip member and to said tray, whereby there is accomplished the proper desired control of the fluid-fluid contacting.

3. The fluid-fluid contact device of claim 2 wherein at least one of said deflector members comprises a leg portion and a portion substantially parallel to said tray, said leg portion being transversely positioned with respect to said tray.

4. A vapor-liquid contact device for causing intimate and efficient contacting of upflowing vapor and downflowing liquid comprising, in combination, a vertical housing, a plurality of vertically spaced-apart superposed contacting trays positioned in said housing, the combination of an outlet weir on and a downcomer connected with each tray, an inlet weir on each tray, said downcomer on one tray extending downwardly towards the inlet weir on the tray therebelow, the outlet weir and downcomer combinations on said trays being staggered with respect to each other, the inlet weirs in said trays being staggered with respect to each other, whereby there is established a liquid level on each tray and whereby the liquid on one tray flows downwardly into the inlet weir on the intermediate lower tray, said combination of outlet weir and downcomer being substantially oppositely positioned with respect to said inlet weir on each tray, whereby the flow of the liquid on each tray is from the inlet weir towards the combination of outlet weir and downcomer, each of said trays having a plurality of spaced-apart openings therethrough, and means for deflecting vapor rising through said openings substantially horizontally through fluid on at least one tray in the direction of the outlet weir and downcomer and for controlling the patterns of the respective fluid flows in accordance with the respective vapor and liquid flow rates, said means including a predetermined number of spaced-apart deflector members directioned in accordance with the respective vapor and liquid flow rates, at least one of said deflector members being positioned over at least a portion of an opening, and means for adjusting said deflector members in predetermined positions, said adjusting means including a strip member attached to said deflector members and clamping means removably attached to said strip member and to said tray, whereby there is accomplished the proper desired control of the liquid-vapor contacting.

5. A device for causing intimate and efficient contacting of fluids, the device comprising a plurality of spaced apart superposed contacting trays positioned in a housing, at least one of said trays having an inlet weir and an outlet weir, a plurality of spaced apart openings in said tray between said inlet and outlet weirs, means on said tray for controlling the hydraulic gradient of the liquid on said tray, said means comprising a plurality of deflector structures, each acting in conjunction with one of said plurality of openings, said structure having at least a portion thereof substantially upwardly rising from said tray and a second deflecting portion having a horizontal component of direction connected thereto positioned above but covering at least a portion of said opening, the portions of said deflecting structure co-acting so as to impart a horizontal, substantially directioned flow to vapors rising through said opening, said flow being directioned towards the outlet weir by a plurality of said deflector structures and towards the inlet weir by a plurality of said deflector structures, said deflector structures being positioned about said openings across the length of said tray so as to form distinct areas across the tray length separating said inlet and outlet weirs wherein a plurality of said structures deflect upflowing vapors horizontally towards said outlet weir, and other distinct areas of said tray wherein said structures deflect upflowing vapors horizontally towards said inlet weir, at least one of said distinct areas being characterized by a plurality of said deflector structures positioned at least two deep across the length of said tray separating said outlet and inlet weirs which direct vapors in the same direction with respect to said outlet and inlet weirs.

6. A device for causing intimate and efficient contacting of fluids, the device comprising a plurality of spaced apart superposed contacting trays positioned in a housing, at least one of said trays having an inlet weir and an outlet weir, a plurality of spaced apart openings in said tray between said inlet and outlet weirs, means on said tray for controlling the hydraulic gradient of the liquid on said tray, said means comprising a plurality of deflector structures, each acting in conjunction with one of said plurality of openings, said structure having at least a portion thereof substantially upwardly rising from said tray and a second deflecting portion having a horizontal component of direction connected thereto positioned above but covering at least a portion of said opening, the portions of said deflecting structure co-acting so as to impart a horizontal, substantially directioned flow to vapors rising through said opening, said flow being directioned towards the outlet weir by a plurality of said deflector structures and towards the inlet weir by a plurality of said deflector structures, said deflector structures being positioned about said openings across the length of said tray so as to form distinct areas across the tray length separating said inlet and outlet weirs wherein a plurality of said deflectors deflect upflowing vapors horizontally towards said outlet weir, and other distinct areas of said tray wherein said deflectors deflect upflowing vapors horizontally towards said inlet weir, a first one of said distinct areas being characterized by a plurality of said deflector structures positioned at least two deep across the length of said tray separating said outlet and inlet weirs which direct vapors towards said outlet weir, and a second one of said distinct areas being characterized by a plurality of said deflector structures positioned at least two deep across the length of said tray separating said outlet and inlet weirs which direct vapors towards said inlet weir.

7. The device of claim 6 wherein said first distinct area is characterized by a plurality of successive rows of said deflector structures positioned across the length of said tray separating said outlet and inlet weirs which direct vapors only towards said outlet weir, and said second distinct area is characterized by a plurality of successive rows of said deflector structures positioned across the length of said tray separating said outlet and inlet weirs which direct vapors only towards said inlet weir.

8. The device of claim 6 wherein said first distinct area is characterized by a plurality of said deflectors adjacent to said inlet weir and being directioned only towards said outlet weir, said second distinct area being characterized by a plurality of said deflectors adjacent said outlet weir and being directioned only towards said inlet weir, and a plurality of deflectors in the intermediate section of the tray are directioned in both said directions.

References Cited in the file of this patent

UNITED STATES PATENTS

| | | |
|---|---|---|
| 1,782,735 | MacKenzie | Nov. 25, 1930 |
| 2,457,398 | Roberts et al. | Dec. 28, 1948 |
| 2,457,686 | Kopita | Dec. 28, 1948 |
| 2,497,136 | Patterson | Feb. 14, 1950 |
| 2,591,343 | Eld | Apr. 1, 1952 |
| 2,718,900 | Nutter | Sept. 27, 1955 |
| 2,772,081 | Hibshman et al. | Nov. 27, 1956 |
| 2,807,451 | Kuhni | Sept. 24, 1957 |
| 2,853,281 | Hibshman et al. | Sept. 23, 1958 |